(12) United States Patent
DiStefano

(10) Patent No.: US 10,850,299 B2
(45) Date of Patent: Dec. 1, 2020

(54) MULTI-MODE LIQUID STORAGE AND DELIVERY APPARATUS

(71) Applicant: Patrick DiStefano, Oxnard, CA (US)

(72) Inventor: Patrick DiStefano, Oxnard, CA (US)

( * ) Notice: Subject to any disclaimer, the term of this patent is extended or adjusted under 35 U.S.C. 154(b) by 0 days.

(21) Appl. No.: 16/658,156

(22) Filed: Oct. 21, 2019

(65) Prior Publication Data

US 2020/0122187 A1 Apr. 23, 2020

Related U.S. Application Data

(60) Provisional application No. 62/749,108, filed on Oct. 22, 2018.

(51) Int. Cl.
*B05C 11/10* (2006.01)
*B05B 1/18* (2006.01)
*B05C 5/02* (2006.01)

(52) U.S. Cl.
CPC ............ *B05C 11/1026* (2013.01); *B05B 1/18* (2013.01); *B05C 5/0225* (2013.01)

(58) Field of Classification Search
CPC ... B05C 11/1026; B05C 5/0225; B05B 11/18; B05B 9/085; B05B 9/0403; A47K 3/288; A47K 3/285; B45F 2003/116; B45F 2003/001; B45F 2003/003; B60R 15/02
USPC ............ 222/74, 75, 52, 504, 333, 185, 135; 4/603, 602, 616, 619, 620
See application file for complete search history.

(56) References Cited

U.S. PATENT DOCUMENTS

| | | | | |
|---|---|---|---|---|
| 4,104,744 A * | 8/1978 | Odencrantz | ............... | A45F 3/00 239/373 |
| 5,161,266 A * | 11/1992 | Hildebrand | ............ | A47K 3/288 222/475 |
| 5,251,345 A * | 10/1993 | Pechner | ................. | A47K 3/325 4/603 |
| 6,059,143 A * | 5/2000 | Weir | ......................... | A45F 3/00 222/184 |
| 9,351,611 B1 * | 5/2016 | Adrian | ..................... | F24H 1/165 |
| 9,593,860 B1 * | 3/2017 | Robinson | ............. | F24F 11/0008 |
| 10,767,898 B2 * | 9/2020 | Kuo | .......................... | F24H 1/06 |
| 2005/0279865 A1 * | 12/2005 | Thomason | ............ | B05B 7/2497 239/526 |
| 2013/0001243 A1 * | 1/2013 | Quick | .................... | A47K 3/285 222/135 |
| 2014/0175130 A1 * | 6/2014 | Wheeless | ............... | A45C 15/00 222/333 |

* cited by examiner

*Primary Examiner* — Lien M Ngo
(74) *Attorney, Agent, or Firm* — Eric Kang

(57) ABSTRACT

A liquid storage and delivery apparatus comprising a combination of liquid reservoir, valves, a quick release connector, a liquid pump, a pump power switch, a pressure sensor, and associated hardware. This liquid from this apparatus can be discharged by electric pumping alone, high internal gas pressure alone, or by electric pump augmented by high internal gas pressure.

17 Claims, 8 Drawing Sheets

MULTI-MODE LIQUID STORAGE AND DELIVERY APPARATUS

CROSS-REFERENCE TO RELATED DOCUMENTS

The present application claims priority to provisional patent application No. 62/749,108 filed on Oct. 22, 2018, disclosures of which are incorporated herein at least by reference.

BACKGROUND OF THE INVENTION

1. Field of the Invention

The fields of the disclosure are apparatuses for liquid storage and delivery as well as methods for use.

2. Discussion of the State of the Art

Apparatuses designed to store and transport liquid into and out of a vessel or reservoir are ubiquitous. There are devices which transport liquid from a reservoir to an outlet by a pump or driven out by high differential gas pressure between the gas in the liquid reservoir and the ambient. Crawford [U.S. Pat. No. 9,770,732B2] teaches an apparatus and a group of methods of using the apparatus for the purposes of filling and discharging the liquid storage vessel, where discharge is exclusively by relatively high internal gas pressure. The high internal gas pressure can be created by introducing air by a pump attached to the valve or compressing the air inside the reservoir from a pressurized water line, if available. Baker [U.S. Pat. No. 20130340159A1] presents a portable sprayer powered by rechargeable batteries to obviate the need to manually pressurize the vessel with a hand pump.

Unfortunately, for many apparatuses that rely solely on accumulated high-pressure gas to drive out the liquid, the discharge stream often becomes insufficient and impractical as the liquid level decreases and the reservoir gas pressure correspondingly decreases. This is commonly observed by users of garden sprayers who periodically interrupt their task of spraying to actuate a plunger in order to restore enough internal gas pressure, before all the liquid is fully evacuated from the reservoir. Alternative apparatuses that deliver a more constant and/or sufficiently strong stream from the implementation of an electric pump have the separate issue of energy budgeting, especially when a battery recharging source is unavailable during extended periods of use. None of the prior disclosures discussed any means to combine both modalities to address consistency of discharge stream strength and/or pump energy consumption.

SUMMARY OF THE INVENTION

The present disclosure attempts to reconcile all the aforementioned issues with a new general-purpose multi-mode liquid storage and delivery system and associated methods for using this system. This disclosure describes two main apparatus embodiments of liquid storage reservoirs. One embodiment is a tank made of a hard casing. An alternative embodiment is a collapsible bladder that can be compacted for portability when little or no liquid is present. Hereinafter, the term "reservoir" is meant to represent both the hard case liquid tank and collapsible bladder.

This disclosure also contains two method embodiments of filling the reservoir with liquid: pouring liquid into the reservoir's fill cap or alternatively by pump suction from another liquid source. There are three methods of discharging the liquid. One method is solely by liquid pump scavenging that emphasizes maximum convenience. An alternative liquid discharge method emphasizing no battery consumption is by relatively high internal gas pressure, which is generated by pumping gas through a gas (e.g. Schrader) valve disposed through the reservoir. Another alternative method is use of relatively high internal gas pressure to augment the liquid pump scavenging to deliver the best combination of steady, liquid discharge stream strength, and lower battery draw than the method first mentioned above. The presence of a liquid pump with or without gas pressure augmentation also permits the possibility of a sufficiently strong and/or constant stream when additional liquid conditioning elements like filtration and/or heating/cooling system are added downstream of this system. The liquid pump does not have to be electric but a direct current (DC) electric liquid pump is part of the preferred embodiments. Finally, the disclosure discusses two additional embodiments on how the system can be integrated with a backpack or a motor vehicle.

BRIEF DESCRIPTION OF THE DRAWING FIGURES

DETAILED DESCRIPTION

Figure 1A:
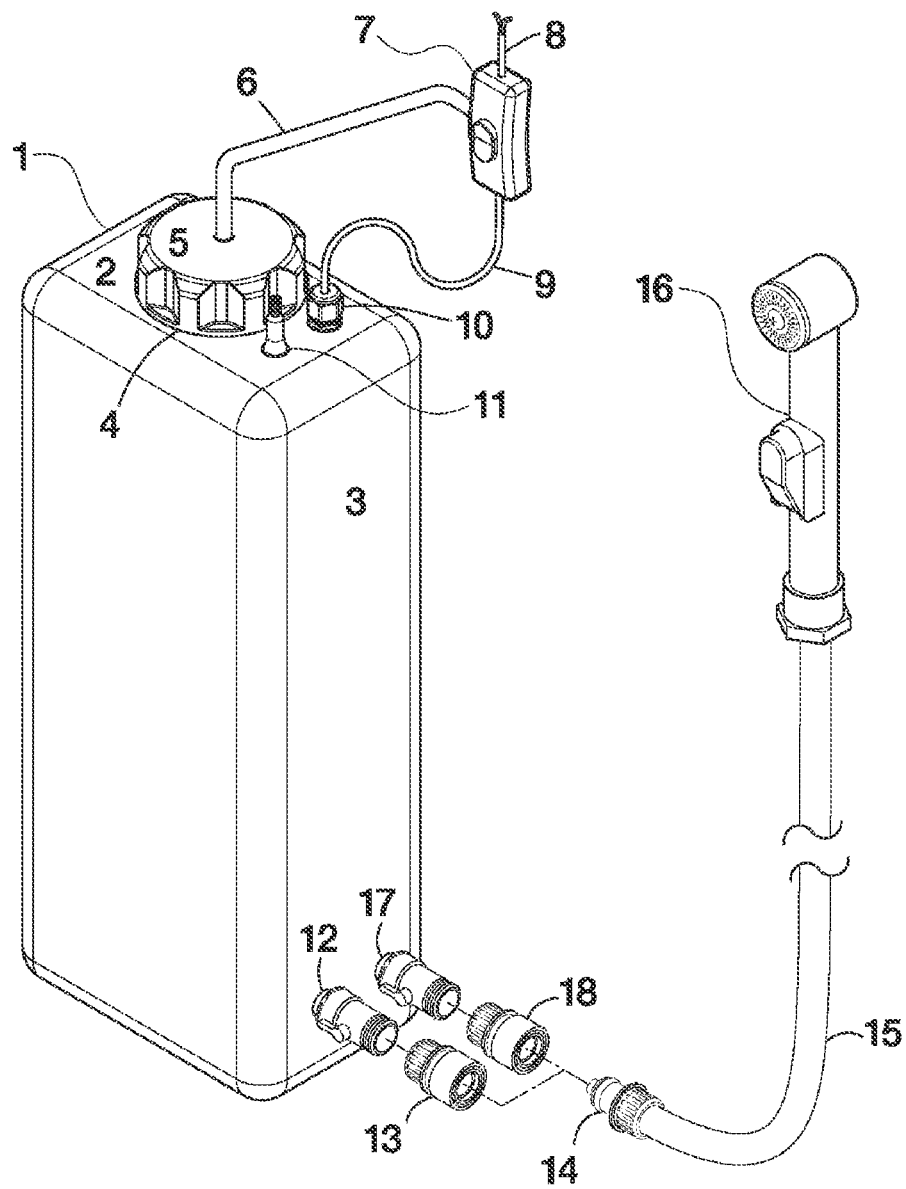
FIG. 1A is an overhead three-quarter external view of an embodiment of the present invention having a hard case liquid tank and associated components.

HARD CASE LIQUID TANK EXTERIOR VIEW (FIG. 1A): FIG. 1A shows an overhead three-quarter view of a reservoir embodiment having a hard case liquid tank (1) [hereinafter referred to as "tank"] and associated components. In this figure, there are two facets of interest: the top-most facet (2) and the right-most facet (3) from the orientation shown. The associated components of each facet (2, 3) comprise of the following. On the top-most facet (2), there is a liquid fill port (4) molded with the tank (1) that can be closed and sealed air-tight by a removable cap (5) with a rubber seal gasket. The outer annular surface of the liquid fill port (4) can be threaded so that the cap (5) can be securely fastened. The cap (5) can optionally have an electronic gas pressure sensor (not shown) embedded on the side facing the inside of the tank (1). If a pressure sensor is present, the sensor would connect to an electrical sensor wire (6) disposed through the cap (5) that transmits power to the sensor and a pressure signal to the power control switch (7)

[hereinafter referred to as "switch"]. The sensor wire (6) is plugged into the switch (7) when the sensor is in operation, but the sensor wire (6) can be disconnected from the switch (7) before the cap (5) is removed or tightened on the liquid fill port (4) and later reconnected to the switch (7). This user-operated switch (7), at the minimum, controls whether battery power is sent via wire (9) to an electric DC liquid pump (20) or not. The liquid pump (20) is fastened to the inner side wall of the right-most facet (3) of the tank (1) near the bottom of the tank (1) (see FIG. 1B). The wire (9) has a waterproof sheath. The switch (7) can optionally have an adjustable control that varies the amount of desired power sent to the liquid pump (20). The same switch (7) can optionally reverse polarity to the liquid pump (20) so that instead of the liquid pump (20) discharging liquid from the tank (1), the liquid pump (20) is filling the tank with liquid. When a gas pressure sensor is present, a circuit in the switch (7) can further adjust the power delivered to the liquid pump (20), in a manner that is inversely proportional to the pressure being sensed. A securing nut (10) with a wire pass-through port allows the wire (9) from the switch (7) to enter the tank (1) and connect to the liquid pump (20). The pass-through port of the nut (10) is sealed air-tight around the wire (9) and can optionally withstand 60-100 psi of pressure. A gas valve (11) is placed near the liquid fill port (4) and cap (5), disposed through the top-most facet (2), and air-tight sealed to the same preferred pressure as the pass-through port of the nut (10).

On the right-most facet (3) close to the bottom where hydrostatic pressure of the liquid filled tank would be nearly the highest, is a pair of similar or identical threaded male ball or liquid flow valves (12, 17) disposed through the tank (1). Liquid flow valve (12) and liquid flow valve (17) need not be placed on the same face, here the right-most facet (3). Each liquid flow valve (12, 17) can be open to permit fluid flow or closed. When closed, the liquid flow valves (12, 17) seal air-tight and can optionally withstand 60-100 psi of pressure. In FIG. 1A, the liquid flow valves (12, 17) are both shown open to allow liquid flow through, as indicated by the arm-like switch oriented substantially parallel to the streamwise direction. Liquid flow valve (12) is associated to the liquid pump (20) outlet. The other liquid flow valve (17) is not associated with the liquid pump (20), and is used for the discharge method that relies only on relatively high internal gas pressure, as will be described later. Both liquid flow valves (12, 17) can each accept a threaded quick release female connector (13, 18). On the opposite end of the interface with the liquid flow valves (12, 17), each of the quick release female connectors (13, 18) interfaces with a complementary male coupler (14) fixed to a hose (15) that leads to a shower-style hand nozzle (16) [hereinafter referred to as "nozzle"]. The hose (15) can be coupled to the nozzle (16) using a quick release coupler. The quick release female connectors (13, 18) are at least similar and can be identical. The hose (15) can be substantially linear or self-coiling. The nozzle (16) can be of the adjustable variety to switch between a concentrated stream, diffuse mist, and any other pattern or alternatively, it can be a single purpose nozzle that only delivers one type of stream. Instead of a nozzle (16), the hose (15) could be connected to an inline filtration element (not shown) and/or liquid cooling or heating loop (not shown). Other elements can be coupled using a quick release coupler. The application also does not need to be for shower or cleansing and hence, the nozzle (16) may optionally be omitted. The switch (7) can optionally be integrated in the nozzle (16).

The exemplary tank (1) in FIG. 1A is substantially hexagonal. The preferred capacity and dimensional embodiment of the tank (1) are 2.75-3.0 gallons of water and the dimensions shown in table 1. However, the tank (1) can be of varying other shapes and sizes for the application at hand.

TABLE 1

Preferred Dimensions of Hard Tank (1)

| Gallons | Volume (in³) | Height (in) | Width (in) | Depth (in) |
|---------|--------------|-------------|------------|------------|
| 2.75    | 635.25       | 19.00       | 10.00      | 3.34       |
| 2.80    | 646.80       | 19.00       | 10.00      | 3.40       |
| 2.85    | 658.35       | 19.00       | 10.00      | 3.47       |
| 2.90    | 669.90       | 19.00       | 10.00      | 3.53       |
| 2.95    | 681.45       | 19.00       | 10.00      | 3.59       |
| 3.00    | 693.00       | 19.00       | 10.00      | 3.65       |

The tank (1) can either be a single wall or double-walled. A double-walled construction can have a sealed gap of dry gas to improve thermal insulation. For even greater thermal insulation, the volume in between the two walls of the double-wall structure can be optionally vacuum sealed. The tank's (1) construction should withstand at least 30 psi or internal pressure and can optionally withstand 60-100 psi of internal pressure and can be made from various of materials that are compatible with the liquids being carried. For water, this can preferably be of some form of plastic like ABS for severe physical duty, polyvinyl chloride (PVC), polycarbonate for durable scratch-resistant transparency and UV resistance, polypropylene or PVDF if subject to many chemicals or solvents, and many more. An exemplary material for the double-wall construction embodiment can be 18/8 food grade stainless steel. Regarding serviceability, the tank (1) is constructed such that any component attached to or disposed through the tank (1) can be easily removed and replaced without damage to the tank or other components.

The tank (1) can have a "jacket" (not shown) slipped or fastened on to cover a large portion of the exterior surfaces of the tank (1) with cutouts for various protruding items (e.g., 4, 5, 10, 11, 12, 17). The primary purpose of the jacket can be to further insulate the liquid from heat transfer with the exterior elements. The jacket made from a flexible insulating material like neoprene. Various jacket colors can be used according to whether one wants to maximize or minimize radiation absorption from external elements like the sun.

Figure 1B:
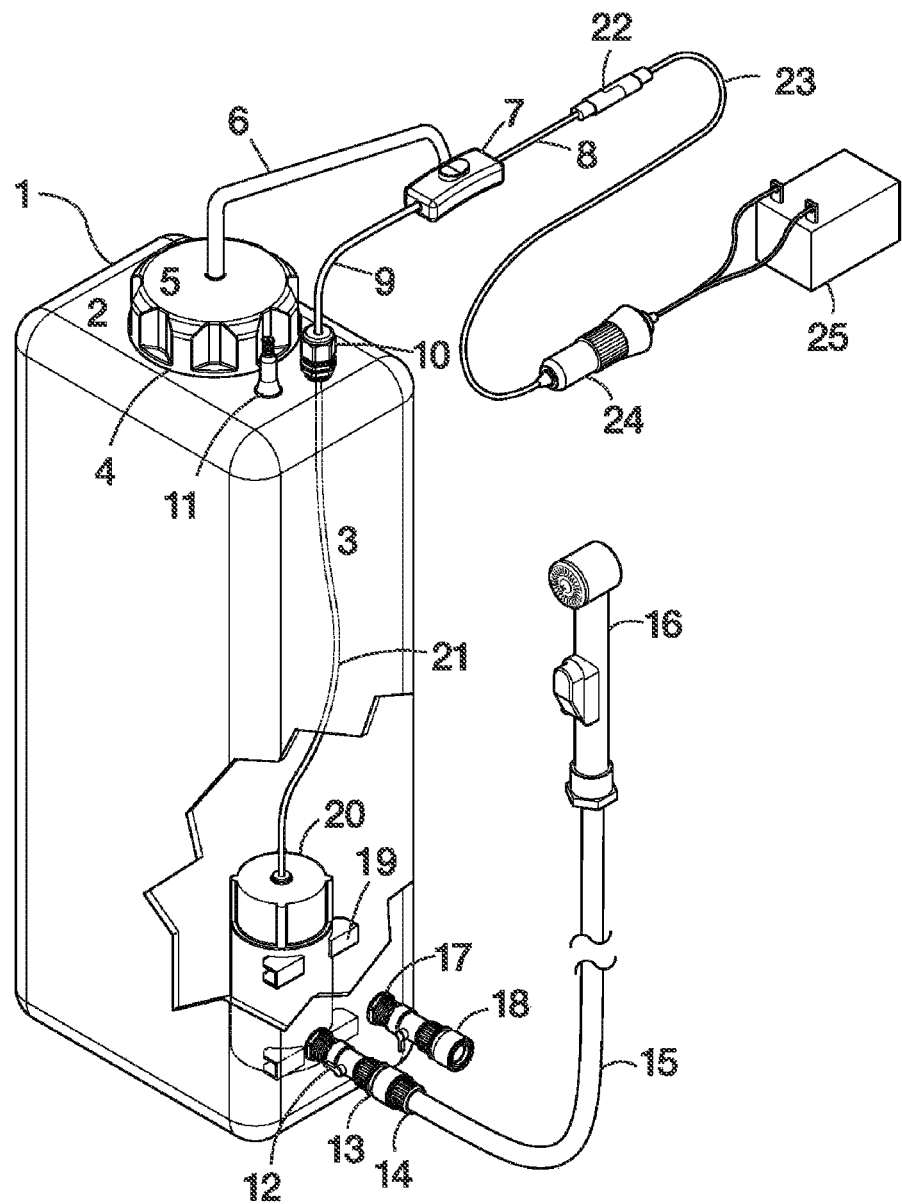
FIG. 1B is a cutaway view of the embodiment of FIG. 1A showing a pump inside the hard case liquid tank and pump power supply.

HARD TANK WITH CUTAWAY VIEW (FIG. 1B): FIG. 1B considers the embodiment of FIG. 1A as a cutaway view with both and exposed and hidden view of a wire (21) between the nut (10) and the liquid pump (20). In this example, the liquid pump (20) is wrapped in a hard molded casing with "feet-like" flanges (19) that mate and fasten to the inside surface of the tank (1). The liquid pump (20) has two liquid ports, where the outlet during discharge is shown to mate to said liquid flow valve (12). In one liquid filling method embodiment to be discussed, the liquid pump (20) outlet connected to the liquid flow valve (12) reverses its role to become an inlet port when the liquid flow valve (12) is open and the switch (7) is set with reverse DC voltage polarity to draw liquid into the tank (1); the same port connected to liquid flow valve (12) becomes an outlet port when the liquid flow valve (12) is opened and the switch (7) DC voltage polarity is set to scavenge the liquid from the tank (1).

Between the switch (7) and battery (25) is a segment of power delivery wire (8) leading to a releasable electrical connector (22). The connector (22) can be connected to a variety of power sources. In this example, another wire segment (23) connects to a male plug-to-female-port assembly (24) that resembles an automotive electrical accessory plug/port. The battery (25) can be a portable DC unit or one associated with an automobile within physical proximity to this tank (1).

Figure 2A:
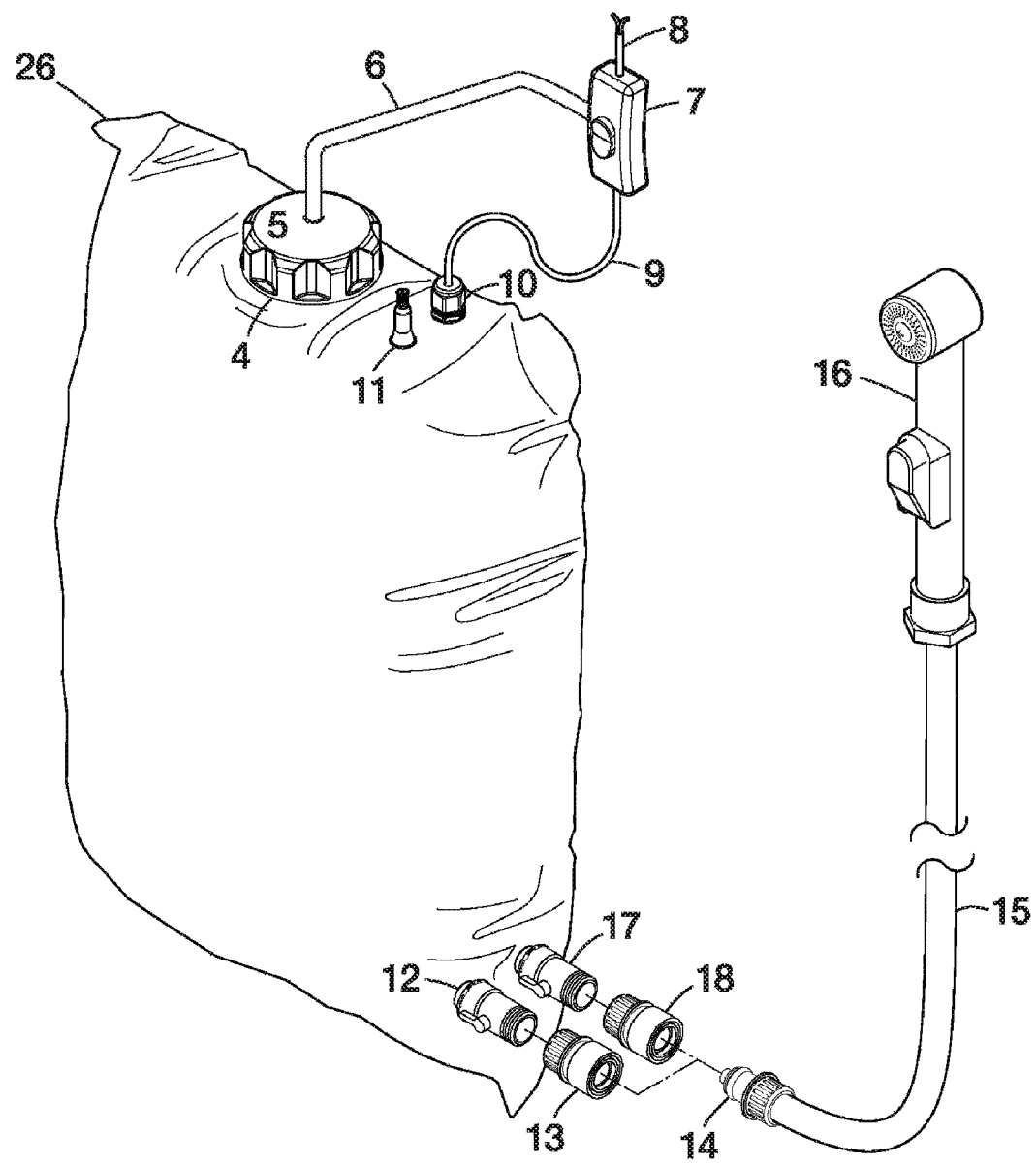
FIG. 2A is an overhead three-quarter view of a further embodiment of the present invention having a deformable liquid bladder and associated components.
Figure 2B:
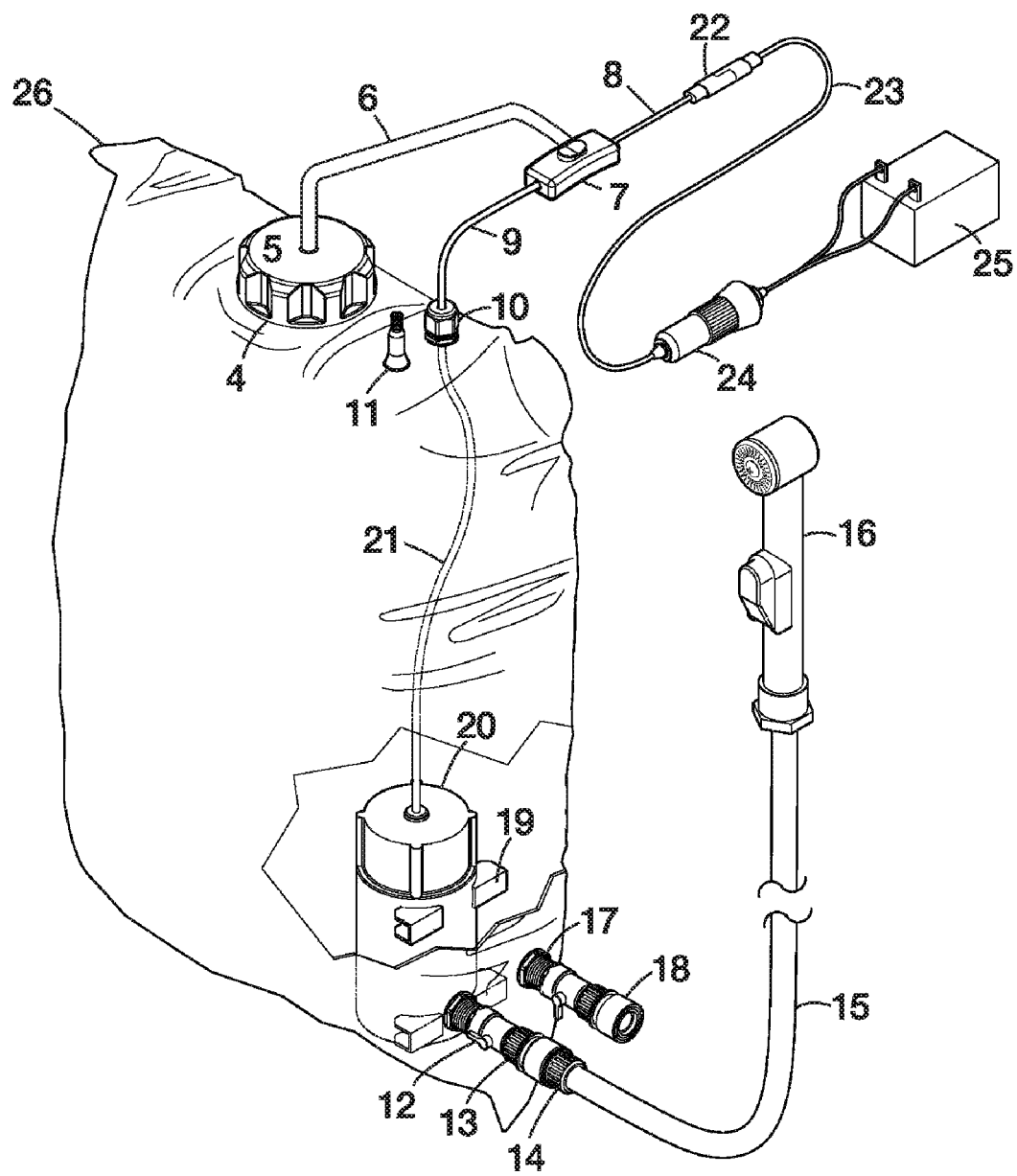
FIG. 2B is a cutaway view of the embodiment of FIG. 2A showing a pump inside the deformable liquid bladder and pump power supply.

DEFORMABLE LIQUID BLADDER (FIGS. 2A and 2B): FIG. 2A shows an overhead three-quarter view of a reservoir embodiment being a deformable liquid bladder (26) [hereinafter referred to as "bladder"] and associated components (4-16). FIG. 2B is analogous to FIG. 1B except that the reservoir is a bladder (26) as shown in FIG. 2A instead of a tank (1). The operation and general placement of the associated components (4-25) are identical between the bladder (26) and tank (1).

An exemplary bladder (26) in FIGS. 2A and 2B can have a substantially rectangular profile. The preferred capacity of the bladder (26) is identical to the tank (1). However, due to the expandability of the bladder (26) when filled with liquid and gas, the external dimensions of the bladder (26) will be different than an equal capacity tank (1). Furthermore, the bladder (26) can be of varying shapes and sizes for the application at hand.

The bladder's (26) construction should withstand at least 30 psi or internal pressure, and can optionally withstand 60-100 psi of internal pressure while holding fluid and gas up to 140 deg. F. In order to withstand high internal gas pressures, the construction of the bladder (26) could comprise of two or more fiber-reinforced layers of appropriate material(s). The bladder (26) is foldable or can be compacted when empty for portable storage and is preferably deformable even when surface temperatures are approximately −10 deg. F. The material is preferably resistant to hardening and tearing after many cycles of filling, discharging, compacting, expansion, heating, cooling, and physical transport. Extra reinforcement to the bladder (26) is preferred in the proximity of components (4, 10, 11, 12, 17, 19) to cope with stress concentrations. Candidate bladder (26) materials can be LPDE or Reinforced LDPE film if the stored liquid is water, HDPE film if alcohol or esters are stored, and many more.

TWO METHODS TO FILL THE RESERVOIR: Embodiments of the reservoir (1, 26) can be filled with liquid by one of at least two available methods. One method is to remove the cap (5) and pour liquid from another source into the liquid fill port (4). After pouring is done, the cap (5) is fastened back to the liquid fill port (4) to make the container airtight. Once the cap (5) is securely fastened on the liquid fill port (4), one can optionally pressurize the liquid filled reservoir (1, 26) by introducing gas through the gas valve (11) from a $CO_2$ canister (not shown), or manual gas pump (not shown), or motorized gas pump (not shown). Gas pressurization will enable two of the three liquid discharge methods to be discussed below to reduce or eliminate power consumption by the liquid pump for a given liquid discharge flow rate. Gas pressurization by this approach can be done if both valves (12, 17) are closed or one of the liquid flow valves (12 or 17) is open and liquid is being discharged simultaneously through the open liquid flow valve (12 or 17). In other words, one can pressurize the reservoir (1, 26) even as the liquid is discharging.

Figure 3:
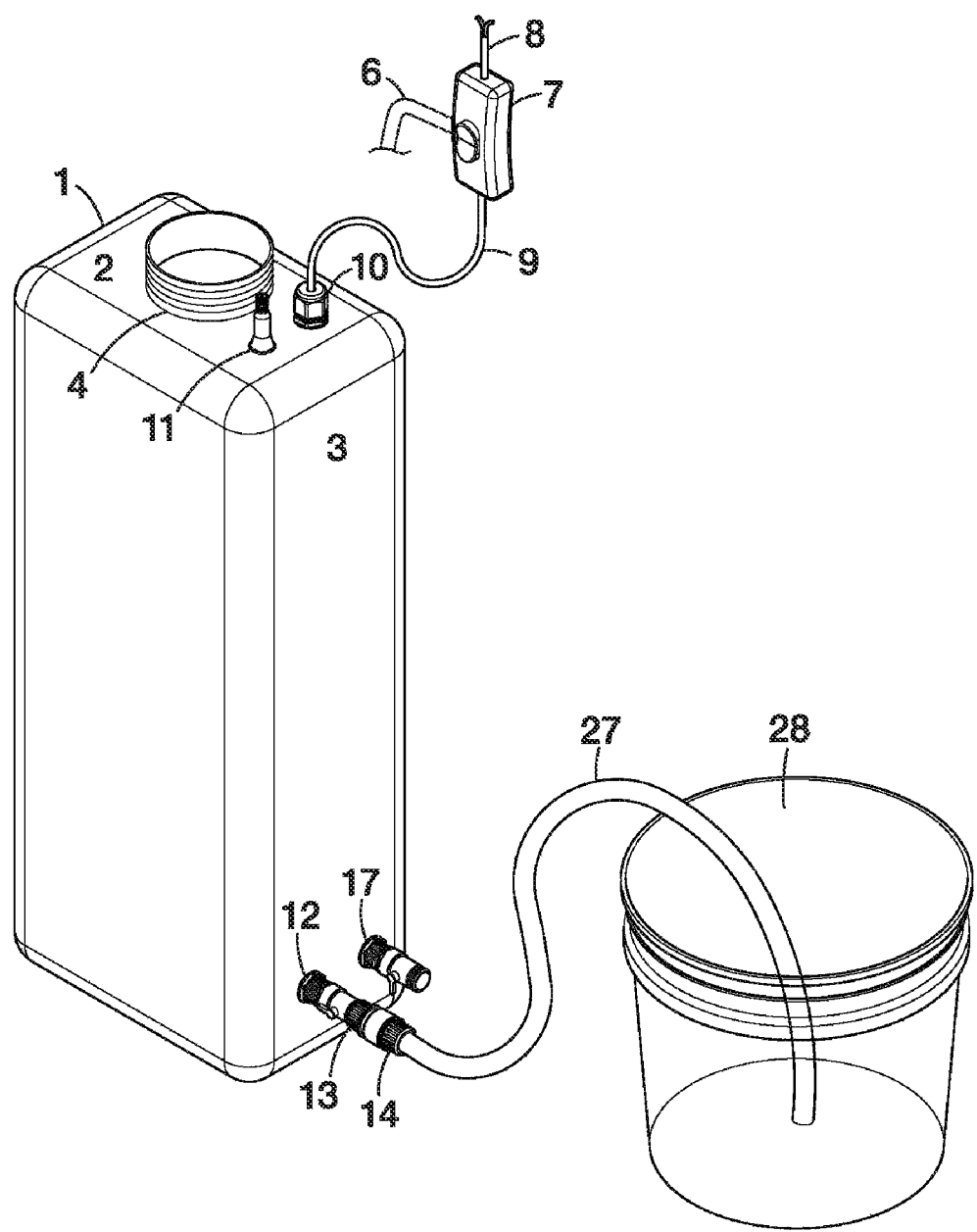
FIG. 3 depicts a configuration of filling the reservoir by pump suction of liquid from another source.

FIG. 3 shows an alternative method where the liquid flow valve (17) is closed, the liquid flow valve (12) is open with one end of a quick release female connector (13) threaded on. On the other end of the quick release female connector (13) is an attached male coupler (14) that, in turn, is fixed to a hose (27) which picks up liquid (not shown) from an external source like a stream or a container with liquid (28). To create suction and draw fluid into the tank (1), the switch (7) can have a provision to reverse polarity of the DC voltage across the liquid pump (20). An inline filtration element (not shown) can also be placed prior to the liquid being drawn into the liquid pump (20). During liquid filling of the reservoir (1, 26), the cap (5) can be removed so that as the liquid fills the reservoir (1, 26), it is done without compressing the gas initially in the reservoir (1, 26), and consequently, the liquid pump (20) does not have to draw extra energy from the battery (25) to compress the gas. After liquid filling, the cap (5) can be securely fastened on the liquid fill port (4), and one can optionally pressurize the liquid filled reservoir (1, 26) by introducing gas through the gas valve (11) from a $CO_2$ canister (not shown), or manual gas pump (not shown), or motorized gas pump (not shown). A break line for the optional pressure sensor wire (6) is shown because the cap (5) is not shown in FIG. 3. If battery (25) energy is not a concern and if the liquid pump (20) is of sufficient capacity, then the cap (5) can be securely fastened on the liquid fill port (4) prior to filling the reservoir (1, 26) with liquid. This allows the gas initially in the reservoir (1, 26) to be compressed as the liquid fills the reservoir (1, 26). The compressed gas acts like a compressed mechanical spring that stores energy expended by the battery (25), which can later release its energy in two of the three liquid discharge methods to be described below to reduce or eliminate electricity consumption.

THREE METHODS TO DISCHARGE THE RESERVOIR: The reservoir (1, 26) can discharge liquid from one of at least three available methods. In one mode, most clearly shown in FIGS. 1B and 2B, the liquid (not shown) is drawn into the liquid pump (20) and discharged through the liquid flow valve (12). The other liquid flow valve (17) during this mode is closed. In this mode and prior to liquid discharge, the quick release female connector (13), male coupler (14), hose (15) and any downstream apparatus such as a nozzle (16) or an inline filter (not shown) and/or heating/cooling loop (not shown), or other elements that suit the application. To initiate liquid discharge with this method, the liquid flow valve (12) is opened and the switch (7) is activated to deliver power to the liquid pump (20).

FIGS. 1A and 2A most closely show an alternative liquid discharge method, with exceptions that liquid flow valve (12) is closed rather than open as shown. It is straightforward to visualize that prior to discharge, the liquid flow valve (17) be connected to the quick release female connector (18) that connects to the male coupler (14), hose (15) and any downstream apparatus such as a nozzle (16) or an inline filter (not shown) and/or heating/cooling loop (not shown), or other elements that suit the application. An important consideration for this alternative method is that liquid (not shown) is not scavenged from the reservoir (1, 26) using liquid pump power. Instead, the prime mover of the liquid is gas pressure that is higher in the reservoir (1, 26) than the discharge ambient pressure. The required pressure difference is based on the desired liquid flow rate after overcoming potential energy (i.e., upward elevation), assistance from hydrostatic pressure which scales with the liquid level in the reservoir, and flow losses as the liquid transports downstream. The relatively high reservoir (1, 26) gas pressure can be achieved by any one of a plurality of means previously described in gas pressurizing the reservoir (1, 26). To initiate liquid discharge with this alternative method, once sufficiently high internal gas pressure is established, the liquid flow valve (17) is opened. The operator can periodically restore or increase gas pressure in the reservoir (1, 26) as the liquid discharges.

In another alternative mode, best shown by FIGS. 1B and 2B with identical connections as in the liquid discharge mode described first, the two earlier mentioned modes work in tandem. During liquid discharge, the liquid flow valve (17) is closed, the liquid flow valve (12) associated with the liquid pump (20) outlet is opened, the liquid pump (20) is turned on by the switch (7), and the liquid pump (20) discharges the liquid (not shown) along the same path in the mode first described in this section. However, gas pressure in the reservoir (1, 26) can also be higher than the ambient pressure such that for the given discharge flow rate, there is less power consumption from the liquid pump (20). In addition, for given electrical consumption, pump output augmented by high internal gas pressure can boost the discharge flow rate. With this method, one can optionally employ a gas pressure sensor to send pressure signals via sensor wire (6) to a control unit inside the switch (7) that, in turn, actively controls electrical power delivery to the liquid pump (20) based on measured gas pressure inside the reservoir (1, 26). The delivered power to the liquid pump (20) is inversely proportional to the referenced gas pressure. Hence, if the discharge event starts off with a reservoir (1, 26) full of liquid and internal gas pressure much higher than external ambient pressure, the initial discharge stream can rely mostly on the energy from gas pressure and hydrostatic pressure, with relatively little electrical energy from the battery (25). However, as the reservoir (1, 26) liquid level depletes, both the internal gas and hydrostatic pressure diminishes. To compensate for lower drive from diminishing gas and hydrostatic pressure, the pump control unit in the switch (7) signals more power to be delivered to the liquid pump (20) to maintain a constant and/or sufficiently strong stream. The power delivery can be continuously and automatically adjusted as the internal pressure continuously changes. If the user pumps gas to raise pressure, the pressure sensor will send the corresponding signal to the control unit in the switch (7), which will reduce power to the liquid pump (20) to conserve battery charge. Although this embodiment discloses an electronic gas pressure sensor, other types of sensors, combinations of different types of sensors, even the type of mechanism referencing the gas pressure can be used to perform that same function as the disclosed pressure sensor.

The following two embodiments describe at least two ways to integrate the disclosed apparatus within another structure for a given application. It should be noted that the disclosed apparatus can be used and integrated in different structures for different applications.

Figure 4:
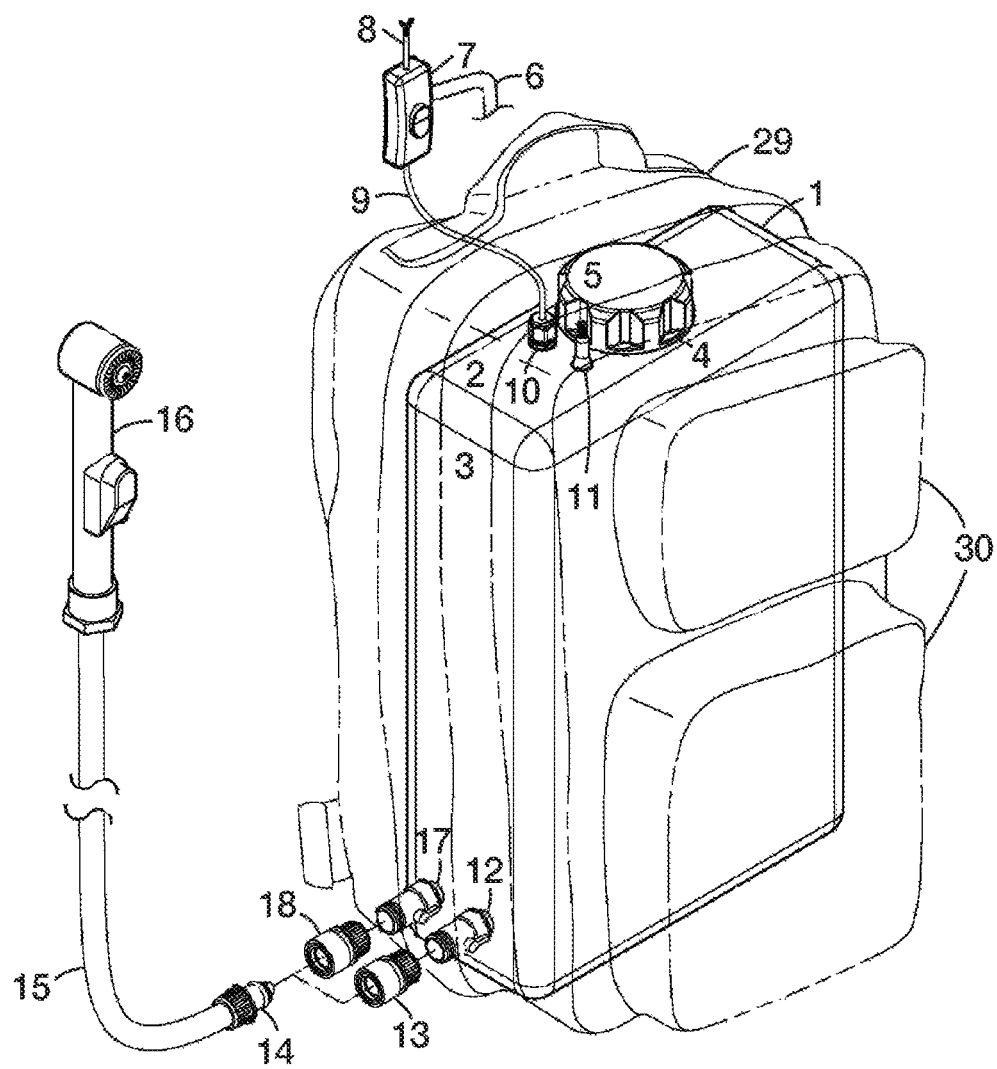
FIG. 4 shows a further embodiment of the present invention adapted to be carried in a backpack.

BACKPACK INTEGRATION: The disclosed liquid storage and delivery apparatus in either the hard tank (1) or bladder (26) embodiments can be integrated with a backpack (29). FIG. 4 shows the tank (1) embodiment integrated in a backpack (29), and shown as transparent to illustrate the relative orientation of the reservoir (1, 26). The reservoir (1, 26) can be secured in the backpack (29) using flexible loop-like (not shown) or sleeve-like (not shown) structures within the backpack (29). Dedicated cutouts in the backpack (29) allow liquid flow valves (12, 17), wire (9), nut (10), gas valve (11), and optionally the cap (5) to pass through. A preferable backpack (29) material would be flexible, rugged, and optionally waterproof. An example material can be nylon with appropriate coatings to make waterproof. Pouches (30) of the backpack (29) can be used to store extra batteries (25) or gear related to as well as unrelated to the disclosed apparatus. As previously mentioned, the hose (15) can be self-coiling and be stored along with any attachment such as the nozzle (16) in a separate pouch (30) located anywhere on the backpack. The backpack (29) can have inverted molded pieces (not shown) fixed with the backpack (29) so components like the switch (7) and wire (9) can be neatly stored flush to the backpack (29).

Figure 5A:
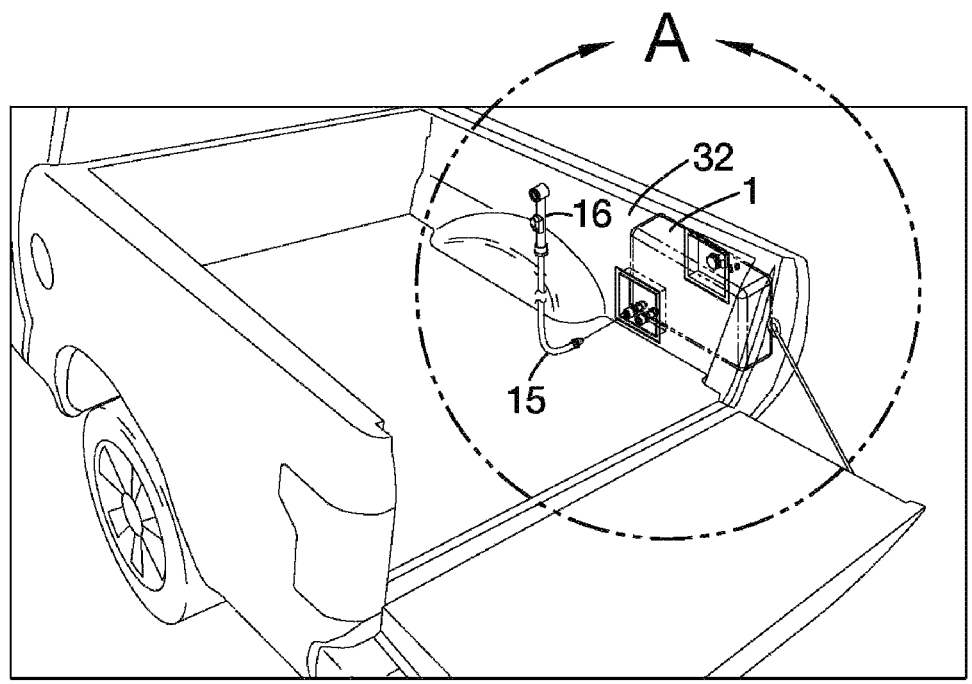
FIG. 5A illustrates a further embodiment of the present invention adapted to be integrated with a motor vehicle.
Figure 5B:
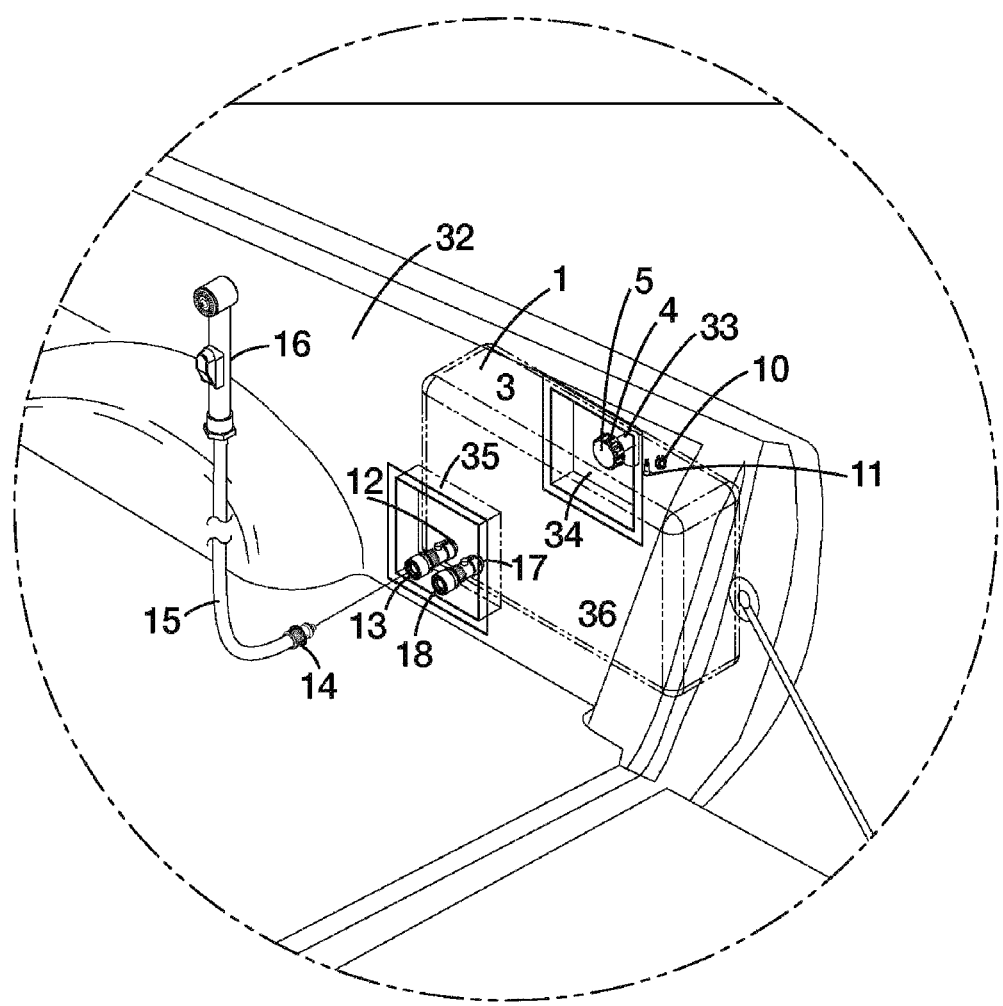
FIG. 5B is a close-up view of the embodiment of FIG. 5A and associated components.

MOTOR VEHICLE INTEGRATION: The disclosed liquid storage and delivery apparatus using the tank (1) embodiment is shown in FIGS. 5A and 5B. An exemplary application can be a pickup truck with the tank (1) placed in an open volume area within the quarter panel (32) as shown. The liquid flow valves (12, 17) are disposed through a different face (36) of the tank (1) than shown in FIGS. 1A and 1B, and placed low on the face (36) as notionally shown in FIGS. 5A and 5B. The valves are preferably recessed from the bed area within a cutout insert (35) to avoid potential interference with cargo. As shown, the cap (5) and liquid fill port (4) sit recessed with another cutout (34) above any face of the tank (1). In this embodiment, a tube-like fill neck (33) connects to the liquid fill port (4) and is disposed through the right-most facet (3) of the tank (1).

FLASHLIGHT FUNCTION OF NOZZLE: A further embodiment of the nozzle (16) can house batteries (not shown), LED lights (not shown), and decoupled from the hose using a quick coupler. The LED lights can encircle the discharge holes of the nozzle (16). The nozzle (16) can then be used as a standalone flashlight.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment.

The words used in this specification to describe the embodiment and its various embodiments are to be understood not only in the sense of their commonly defined meanings, but to include by special definition in this specification structure, material or acts beyond the scope of the commonly defined meanings.

What is claimed is:
1. A liquid storage and delivery apparatus comprising:
a liquid reservoir;
a gas valve stem disposed through the reservoir;
a liquid fill port molded with the reservoir;
a cap, wherein cap securely seals said liquid fill port under high pressure;
two liquid flow valves disposed through the reservoir near the lowest level of said liquid reservoir;
a quick release female connector, wherein the quick release female connector couples to one of the two liquid flow valves on one end, and a male coupler connected to the opposite end of the quick release female connector;
a liquid pump, wherein the pump is attached at the inside of said reservoir and the outlet of said pump is sealed with one of two said liquid flow valves;
a securing nut disposed through said reservoir;
and a pump power switch, wherein a wire running to one end of said switch is connected to a power supply, and a wire from the opposite end of said switch is disposed through said securing nut and continues inside the reservoir to said liquid pump.
2. The liquid storage and delivery apparatus of claim 1, further comprising a hose connected on one end to the male coupler, and the male coupler in turn connects to the quick release female connector, and the quick release female connector in turn connects to one of the liquid flow valves.

3. The liquid storage and delivery apparatus of claim 2, further comprising a shower-style hand nozzle, connected to the downstream end of said hose when said liquid storage and delivery apparatus is discharging liquid.

4. The liquid storage and delivery apparatus of claim 3, wherein said shower-style hand nozzle can couple and decouple from said hose using a combination of a female quick release connector and a male coupler.

5. The liquid storage and delivery apparatus of claim 1, wherein said pump power switch has an adjustable control that varies the amount of desired power sent to said liquid pump.

6. The liquid storage and delivery apparatus of claim 1, wherein said reservoir is a substantially hexagonal hard case tank that is single or double-walled.

7. The liquid storage and delivery apparatus of claim 1, wherein said reservoir is a fiber-reinforced deformable liquid bladder.

8. The liquid storage and delivery apparatus of claim 1, wherein said cap houses a pressure sensor placed on the surface exposed to the internal volume of said reservoir, so as to measure internal pressure of the reservoir when said cap is securely sealed on said liquid fill port.

9. The liquid storage and delivery apparatus of claim 8, wherein an electrical wire from said cap connects to a gas pressure sensor and continuously transmits an internal gas pressure signal to a control unit in said pump power switch.

10. The liquid storage and delivery apparatus of claim 1, wherein said shower-style hand nozzle can house batteries and hold LED lights to illuminate its surroundings.

11. The liquid storage and delivery apparatus of claim 1, wherein said pump power switch, is alternatively integrated with said shower-style hand nozzle, having a wire running from one end of said switch to a power supply, and a separate wire with waterproof sheath from the opposite end of said switch disposed through said securing nut and continues inside said reservoir to said liquid pump.

12. The liquid storage and delivery apparatus of claim 1, wherein said liquid pump is powered by direct current (DC) electricity and the pump power supply switch has a provision for the user to reverse polarity of the DC voltage across said DC electric liquid pump, so that liquid can be drawn into said reservoir as an alternate mode to discharging liquid from said reservoir.

13. The liquid storage and delivery apparatus of claim 1, including at least one member from a group consisting of:
   (A) An inline filtration element placed downstream of one or more of said liquid flow valves;
   (B) And a liquid heat exchanger placed downstream of one or more of said liquid flow valves.

14. The liquid storage and delivery apparatus of claim 1, wherein said liquid flow valve not sealed with said liquid pump outlet is in the closed position and said liquid flow valve sealed with said liquid pump outlet is in the open position, for the mode when the liquid discharges from said reservoir by liquid pump power or a combination of liquid pump power and favorable pressure gradient between the internal pressure of said reservoir and the pressure just downstream of said liquid flow valve in the open position.

15. The liquid storage and delivery apparatus of claim 9, wherein the power supplied to said liquid pump is actively adjusted by said control unit that references the internal gas pressure signal in order to maintain a desired liquid discharge flow rate.

16. The liquid storage and delivery apparatus of claim 12, wherein said liquid flow valve not sealed with said liquid pump outlet is in the closed position, said liquid flow valve sealed with said outlet of said liquid pump is in the open position, said liquid flow valve in the open position is mated to said quick release female connector, which in turn is attached to said male coupler, which in turn is connected to a hose, which in in turn leads to an external liquid source such as a stream or a container filled with liquid, for the mode when drawing liquid into said reservoir, and said pump power switch set so that the DC voltage across said liquid pump is at a reverse polarity when compared to the polarity set for a different mode when discharging liquid from said reservoir.

17. The liquid storage and delivery apparatus of claim 16, wherein an inline filtration element is in between said liquid flow valve in the open position and said hose.

* * * * *